(No Model.)  2 Sheets—Sheet 1.
T. B. HARKINS.
MOLDING MACHINE.
No. 387,716.  Patented Aug. 14, 1888.
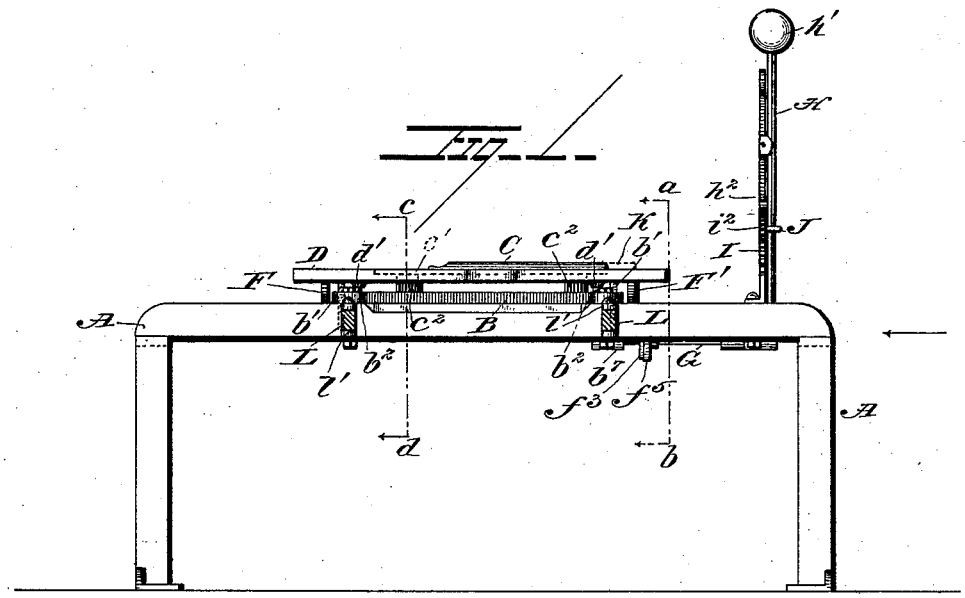
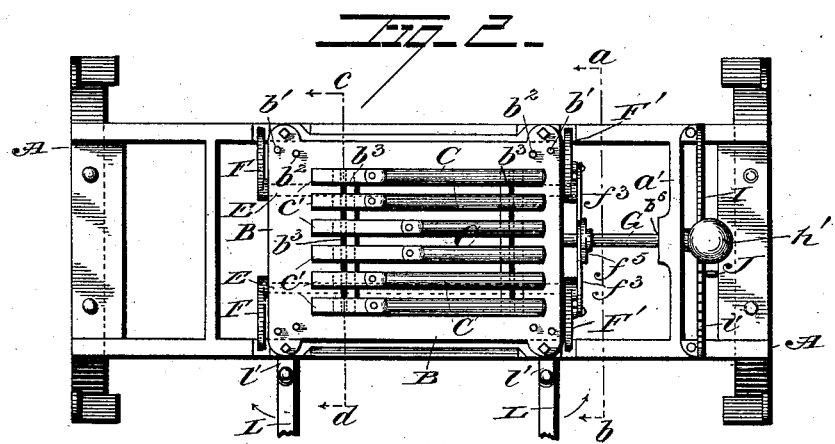
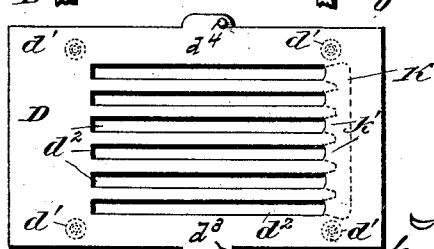
WITNESSES:
Tho. Nolan
Wm. H. Carson
INVENTOR,
Thomas B. Harkins,
by Joshua Pusey
Attorney (No Model.) 2 Sheets—Sheet 2.
T. B. HARKINS.
MOLDING MACHINE.
No. 387,716. Patented Aug. 14, 1888.
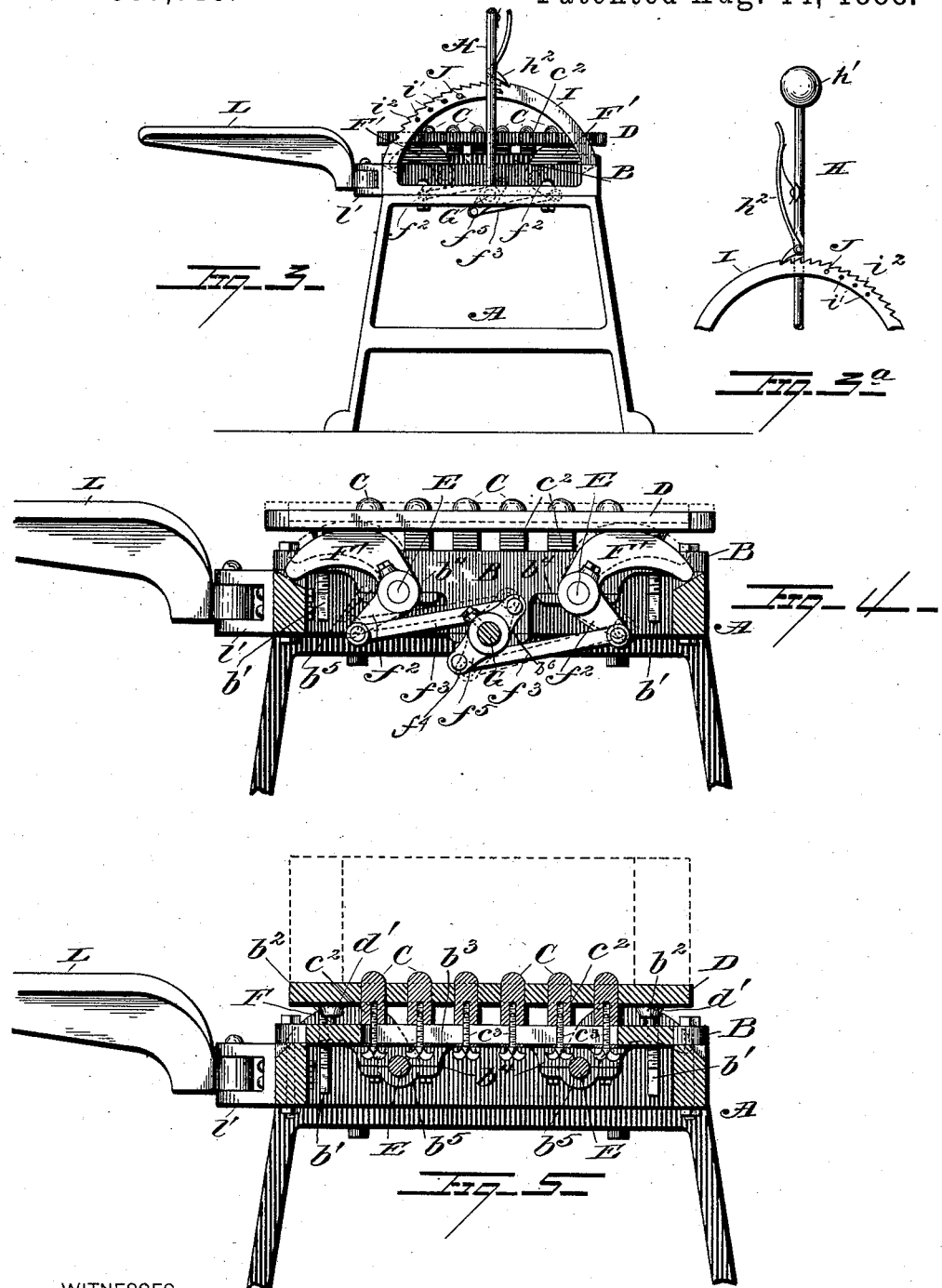

UNITED STATES PATENT OFFICE.

THOMAS B. HARKINS, OF BRISTOL, PENNSYLVANIA.

MOLDING-MACHINE.

SPECIFICATION forming part of Letters Patent No. 387,716, dated August 14, 1888.

Application filed February 28, 1888. Serial No. 265,614. (No model.)

*To all whom it may concern:*

Be it known that I, THOMAS B. HARKINS, a citizen of the United States, residing at Bristol, in the county of Bucks and State of Pennsylvania, have invented certain new and useful Improvements in Molding-Machines, of which the following is a full, clear, and exact description, reference being had to the accompanying drawings, of which—

Figure 1, Sheet 1, is a side elevation. Fig. 2 is a plan, the table being removed and shown in Fig. 2ª. Fig. 3, Sheet 2, is a forward end view. Fig. 3ª is a detail showing the ratchet-and-pawl device. Fig. 4 is a transverse vertical section, enlarged, as on the line $a\,b$, Figs. 1 and 2, the dotted lines showing the position of the table and cam devices when the patterns are removed from the matrices. Fig. 5 is a like section on the line $c\,d$, Figs. 1 and 2, a box being shown in dotted lines upon the table.

The nature of this invention is an organized machine for facilitating the molding of sash-weights and analogous articles; and it consists in certain combinations of devices, which will be hereinafter described, and pointed out in the claims.

Referring to the annexed drawings, A represents the frame-work of the machine; B, a plate bolted thereon; C, a series of patterns secured upon said plate, and D a vertically-movable longitudinally-slotted bed or table registering with said patterns. This bed or table rests normally upon the top of set-screws $b'$, working in the plate B, and is provided on its under side with bosses $d'$, into which extend from said plate B vertical guide-pins $b^2$. The patterns C are of metal, preferably, and each is provided with an integral lower strip or base, $c'$, which has formed or secured on its lower side, near each end thereof, a block, $c^2$, which rests upon and is secured to the top of the plate B. In order that the patterns may be readily attached to and detached from said plate, so that various sizes or kinds of patterns may be employed, I provide the plate with transverse slots $b^3$, intersecting the points upon which said blocks $c^2$ rest, and secure the latter in place by means of thumb-screws $c^3$, passing through said slots and blocks, as seen in Fig. 4. By this construction the patterns may also be moved laterally, so that a greater or less number may be employed, as desired, the table, of course, in each instance being removed, and another one, which is provided with suitable slots or ways, $d^2$, that will register with the patterns, as rearranged, substituted therefor.

The longitudinal slots or ways $d^2$ in the table D correspond in size to the strips $c'$, and the latter fit snugly therein and flush with the upper surface of the table, the patterns alone projecting above the same.

Plate B is provided at each end with depending lugs or brackets $b^4$, in which are formed bearings $b^5$ for longitudinal shafts E. Keyed on the ends of the latter are cams F F', which impinge against the under side of the table. The cams F' on the forward ends of the shafts are in the nature of bell crank levers, being provided with depending arms $f^2$. The latter are pivotally connected by means of links or rods $f^3$ with the arms $f^4$ of a rock-lever, $f^5$, that is secured to a central shaft, G. This shaft rocks in bearings $b^6$ in the forward bracket, $b^4$, of plate B and a cross-bar, $a'$, of the frame, respectively. To the outer end of shaft G is keyed an upright arm, H, whose upper or free end is provided with a weight, $h'$. Bolted on the top of the frame A adjacent to said arm H is a segment, I, which is provided with a series of perforations, $i'$, into any one of which is adapted to be inserted a pin, J, in order to limit the throw of the arm H, as hereinafter described. The periphery of this segment has a series of ratchet-teeth, $i^2$, formed therein, with which engages a spring-controlled pawl-lever, $h^2$, pivoted on the side of arm H.

Having described the construction of the machine, I shall now proceed to explain its operation, which is as follows: The parts being in the position shown in the figures, one of the boxes of the flask is placed upon the table D. The box is then filled with sand and rammed in the usual manner, the patterns on the top of the table forming molds or matrices in the under side of the sand. The arm H is then grasped by and pulled toward the operator, thereby turning the shaft G and its rock-lever $f^5$, which latter, through its connections, imparts motion to the shafts E and the cams thereon. These cams press simultaneously against the under side of the table, and by their peculiar form gradually elevate the latter. Said table having been raised until the patterns are entirely free from the matrices formed thereby, the box is removed.

In order to return the parts to their former or normal position, so that the other box of the flask may be placed upon the table and a like operation gone through with to form the other sections of the matrices for the sash-weights, &c., the pawl $h^2$ is disengaged from the ratchet-teeth in the segment I and the arm H thrown back.

The elevation of the table is checked at a predetermined point by reason of the arm H abutting against the pin J, which projects from one of the holes $i'$ in the segment. To vary the throw of this arm H, and consequently the height of ascent of the table, so as to accommodate various sizes or kinds of patterns, the pin J is removed and inserted in one of the other holes, as required.

On the top of table D, at the forward end of the slots or ways therein, is detachably secured a plate, K, (seen in dotted lines in Figs. 1 and 2,) provided with studs $k'$, leading to the patterns. This forms a runner to the molds, and when the boxes are properly secured together a vertical gate or ingot is connected with said runner.

The guide-pins and eyes in the sides of the cope and drag register with a hole, $d^3$, and pin $d^4$, respectively, at the sides of the table D, so that the matrices will be formed in the proper relative positions.

L L are arms pivoted in brackets $l'$ in the side of the frame A, so that they (the arms) may be swung out, as shown, to form a rest or support to which the box may be removed after the mold is formed therein.

Having thus described my invention, I claim as new and wish to secure by Letters Patent—

1. In a machine of the class recited, the combination of the supporting-frame, the patterns secured thereon, the vertically-movable table provided with slots registering with said patterns, the shafts E, the cams F F' thereon, the shaft G, the rock-lever thereon, the rods connecting said rock-lever and cams F', the arm H on said shaft G, the pawl on said arm H, the toothed perforated segment, and the attachable and detachable stop-pin, substantially as and for the purpose set forth.

2. In a machine of the said class, the combination of the supporting-frame, the plate B thereon, the vertical guide-pins $b^2$ on said plate, the stop or set-screws $b'$, working therein, the patterns secured on said plate, the vertically-movable table D, provided with bosses $d'$, into which extend said guide-pins, and with slots which register with said patterns, the shafts E, the cams F F' thereon, the shaft G, the rock-lever thereon, the rods connecting said rock-lever and cams F', and the arm H on said shaft G, substantially as and for the purpose set forth.

3. In a machine of the said class, the combination of the supporting-frame, the plate B thereon, provided with the transverse slots $b^3$, the patterns, the thumb-screws connecting said patterns with said plate, the vertically-movable table provided with slots registering with said patterns, the shafts E, the cams F F' thereon, the shaft G, the rock-lever thereon, the rods connecting said rock-lever and cams F', and the arm H on said shaft G, substantially as and for the purpose set forth.

4. In a machine of the said class, the combination of the supporting-frame, the slotted table D, the patterns C, the strips or bases $c'$, working in the slots in said table, the plate B, the shafts E, the cams F F' thereon, the shaft G, the rock-lever thereon, the rods connecting said rock-lever and cams F', and the arm H on said shaft G, substantially as and for the purpose set forth.

In testimony whereof I have hereunto affixed my signature this 22d day of February, A. D. 1888.

THOMAS B. HARKINS.

Witnesses:
JESSE O. THOMAS,
C. REGENSBURGER.